(12) United States Patent
Jonas et al.

(10) Patent No.: US 7,596,222 B2
(45) Date of Patent: Sep. 29, 2009

(54) ENCRYPTING DATA FOR ACCESS BY MULTIPLE USERS

(75) Inventors: Per Erwin Jonas, Westbrook, ME (US); Allen Leonid Roginsky, Durham, NC (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 11/766,192

(22) Filed: Jun. 21, 2007

(65) Prior Publication Data

US 2007/0297608 A1 Dec. 27, 2007

Related U.S. Application Data

(62) Division of application No. 10/351,759, filed on Jan. 27, 2003, now Pat. No. 7,272,231.

(51) Int. Cl.
*H04L 9/32* (2006.01)
(52) U.S. Cl. ............... 380/259; 380/281; 380/278; 713/165; 713/183; 713/184; 713/189
(58) Field of Classification Search ........... 713/165, 713/184, 189, 183; 380/281, 285, 259, 278
See application file for complete search history.

(56) References Cited

U.S. PATENT DOCUMENTS 5,495,533 A 2/1996 Linehan et al.
6,694,025 B1 2/2004 Epstein et al.
6,819,766 B1 11/2004 Weidong
6,834,112 B1 12/2004 Brickell
6,959,086 B2 10/2005 Ober et al.
7,065,214 B2 6/2006 Ishiguro et al.
2003/0074566 A1* 4/2003 Hypponen ............ 713/183
2003/0204732 A1 10/2003 Audebert et al.

* cited by examiner

*Primary Examiner*—Kambiz Zand
*Assistant Examiner*—Tongoc Tran
(74) *Attorney, Agent, or Firm*—Schmeiser, Olsen & Watts; David R. Irvin

(57) ABSTRACT

A method for protecting data for access by a plurality of users. A server encrypts data using a master key and a symmetric encryption algorithm. For each authorized user, a key encryption key (KEK) is derived from a passphrase, and the master key is encrypted using the KEK. The server posts the encrypted data and an ancillary file that includes, for each user, a user identifier and the master key encrypted according to the user's KEK. To access the data, a user enters the passphrase into a client, which re-derives the user's KEK, and finds, in the ancillary file, the master key encrypted using the user's KEK. The client decrypts the master key and then decrypts the data. A KEK may be derived from a natural language passphrase by hashing the passphrase, concatenating the result and a predetermined text, hashing the concatenation, and truncating.

9 Claims, 5 Drawing Sheets

FIG. 2

| User Identifiers | Encrypted Master Key | Verification Key |
|---|---|---|
| First Identifier | First Version Of Encrypted Master Key | First Verification Key |
| ⋮ | ⋮ | ⋮ |
| Nth Identifier | Nth Version Of Encrypted Master Key | Nth Verification Key |

ENCRYPTING DATA FOR ACCESS BY MULTIPLE USERS

This application is a divisional of Ser. No. 10/351,759, filed Jan. 27, 2003.

FIELD OF THE INVENTION

The present invention relates to the field of data protection, and more particularly to the field of encrypting large data files so that they may be readily accessed by a plurality of different users.

BACKGROUND

Large data files often need to be protected against unauthorized access. As a result, various cryptographic techniques have been proposed and exploited. Many rely on secret binary keys. For example, a public-private cryptographic system has a private key known only to an individual or to a select group of people, and a public key which may be widely distributed. Data encoded according to the public key can be decoded only by those who know the private binary key. Other cryptographic systems are symmetric, and have a single key which is used both for encryption and decryption. In either case, however, managing the secret keys is problematic, especially in a situation where the keys are changed frequently.

Moreover, because the keys are uniquely associated with individuals or with small groups, the encryption and distribution of large files of data is a cumbersome process when the data needs to be accessed by a large number of independent users each having a different key. For example, consider the shooting and editing of a digital motion picture or film. A director in Hollywood may distribute each day's take to assistants at various locations. Because the resulting files have great value to would-be pirates, they need to be encrypted. Because each user has a different key, however, each file must be encrypted many times using the many different keys, and transmitted many times to the many different users, thus requiring massive processing power and communication bandwidth, and consuming a significant period of time. Further, distributing new keys to the multitude of users requires significant effort, and imposes a significant burden on the users themselves, who need to receive and install each update.

Thus there is a need for a method of encrypting large files of data to be accessed by a number of users, so that processing, bandwidth, delay, and key-management requirements are minimized.

SUMMARY

The present invention provides a way of encrypting large data files that are to be accessed by a large number of users, and at the same time minimizes the delay involved and the need for mammoth processing and communication resources. Further, the invention is amenable to simple key-management techniques.

According to the invention, a data file is encrypted at a server using a master key according to a symmetric single-key encryption algorithm. Each user who is authorized to access the data has a secret passphrase known to the server and to the user. The passphrase may be of any length. For each user, a key encryption key (KEK) is generated, based on the user's passphrase. The master key is then encrypted a multiplicity of times, using the various key encryption keys. The server posts the encrypted data file and an ancillary file that includes, for each user, a user identifier and the master key encrypted according to the user's passphrase-based key encryption key. In some embodiments of the invention, the ancillary file may be combined with or imbedded within the encrypted data file, so that one file which contains both the ancillary file and the encrypted data file may be posted or distributed.

A user accessing the data enters his or her passphrase into a client. The client then locally derives the user's key encryption key from the user's passphrase, and, by examining the identifiers in the ancillary file posted by the server, finds the master key encrypted with the user's key encryption key. The client then decrypts the master key using the locally derived key encryption key, and decrypts the data file using the master key.

According to the invention, the passphrase is hashed using a collision-resistant hash function, to provide a hashed passphrase. The hashed passphrase is then altered using a predetermined text, for example by concatenating the predetermined text and the hashed passphrase, to provide an altered passphrase. The altered passphrase is then hashed, and the result is truncated, to provide the key encryption key.

The invention also includes verification keys that provide quick assurance that the server has used the intended passphrase to encrypt the data. For each user, the server derives a verification key from the user's passphrase, and posts the verification key in the ancillary file. The verification key may be derived by hashing the passphrase using the collision-resistant hash function, to provide a hashed passphrase, which is then altered using a predetermined text, for example by concatenating the predetermined text and the hashed passphrase, to provide an altered passphrase. The altered passphrase is then hashed, and the result truncated, to provide the verification key. The client may read the verification key from the ancillary file, re-derive the verification key locally, and compare the two. If the two verification keys match, the user may presume with confidence that the server has used the intended passphrase.

Thus according to the invention, a large data file need be encrypted only once, and posted along with its ancillary file for access by the various users. Further, aspects of the invention concerning the generation of the passphrase-based key encryption keys and verification keys allow these keys to be changed easily and frequently, if so desired. These and other aspects of the invention will be more fully appreciated when considered in light of the following drawings and detailed description.

BRIEF DESCRIPTION OF THE DRAWINGS

FIG. 2 shows an exemplary organization of an ancillary file.

DETAILED DESCRIPTION

The present invention provides a way of protecting large data files that are to be accessed by a large number of users, and at the same time minimizes the delay involved and the need for mammoth processing and communication resources. Further, the invention is amenable to simple key-management techniques.

Figure 1:
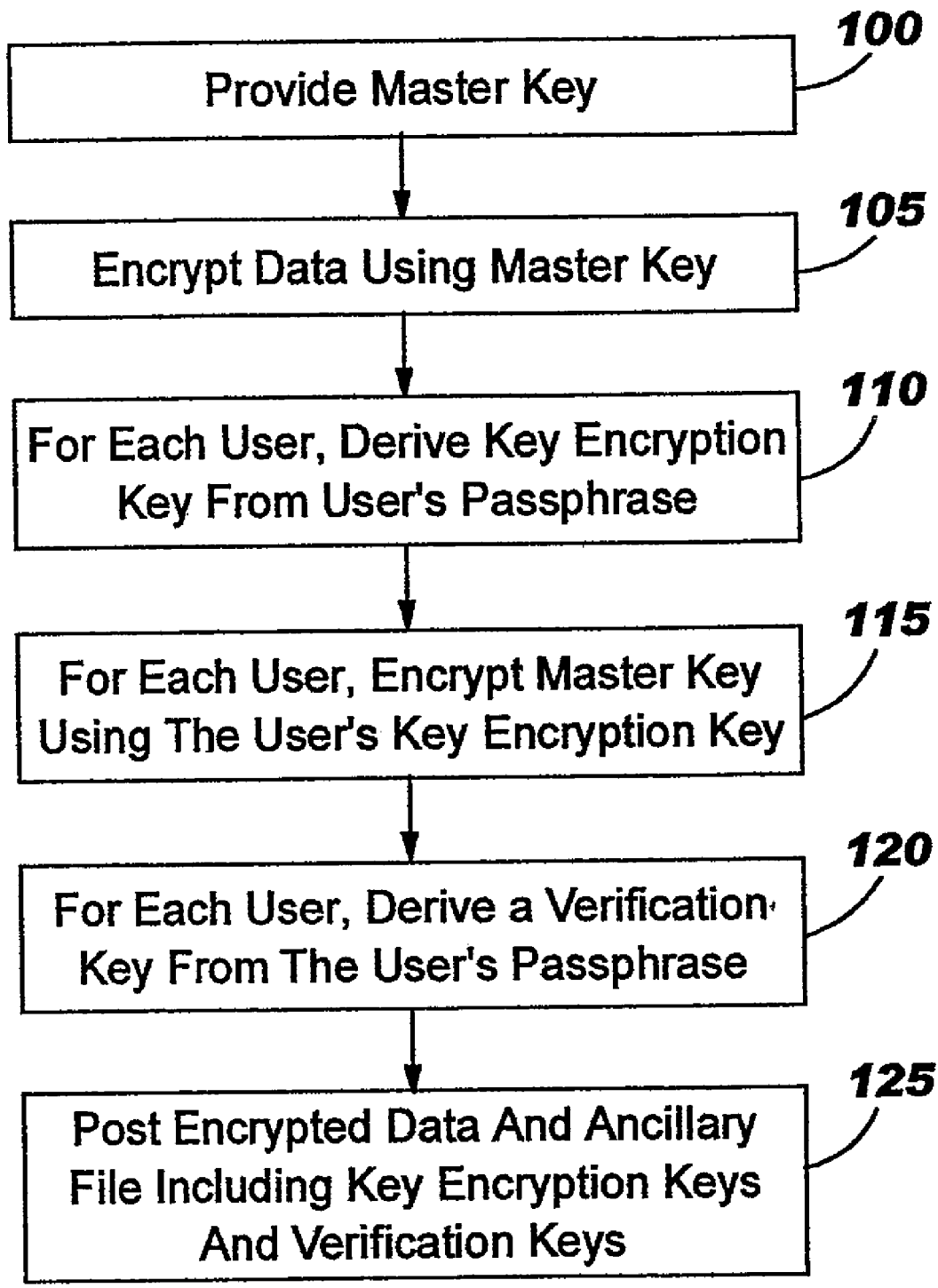
FIG. 1 is a flowchart that shows aspects of the inventive method for encrypting a data file and generating an ancillary file.

As shown in FIG. 1, an encryption key is provided (step 100), called here the master key, which is used to encrypt data according to a symmetric, single-key encryption algorithm (step 105). Preferred embodiments of the invention have a 128-bit randomly generated master key. The data may be encrypted using any suitable algorithm; preferred embodiments of the invention use the "Triple DES" algorithm as described by Schneier in *Applied Cryptography*, John Wiley and Sons (second edition, 1996), or the "Advanced Encryption Standard Algorithm" described in Federal Information Processing Standards, Publication 197, "Advanced Encryption Standard (AES)," 26 November 2001.

The encryption may be performed by a server, or performed by special purpose equipment, or performed in any other suitable way, the purpose being to encrypt the data and make the encrypted result accessible to a plurality of users. Nevertheless, as a descriptive convenience the invention will be described here with reference to an embodiment wherein a server encrypts the data, and makes the encrypted data available over the Internet to clients operated by the users. This particular arrangement is not, however, a necessary condition of the invention.

Each user has a conventional user identifier, which may be public, and also a passphrase, which is known only to the user and the server. A passphrase may be of any length. Users may recall the passphrases from their human memories, and enter them into the clients as the need arises; alternatively, clients may store the passphrases. Thus the invention does not require the frequent distribution of secret 128-bit binary keys, and therefore provides an improvement in the area of key-management convenience from the point of view of the users. On the other hand, the server maintains a table of passphrases. Because the passphrases are sensitive information, care should be taken to protect this table. For example, the table of passphrases held by the server may itself be encrypted so that it cannot be read by a hacker, although this is not a necessary condition of the invention.

For each user, a key encryption key is derived from the user's passphrase (step 110). Further details of the derivation are given below with reference to FIG. 3. The master key is then encrypted using each user's key encryption key according to a symmetric single-key encryption algorithm (step 115). Although the algorithm used to encrypt the master key may be the same as the algorithm used to encrypt the data, this is not a necessary condition of the invention. For each user, a verification key is derived from the user's passphrase (step 120). Further details of the derivation are given below with reference to FIG. 4. The encrypted data is posted by the server for access by the clients, along with an ancillary file that includes a record for each client (step 125) as described below. Here, the term "post" is used broadly, and includes all ways of making data available to users; the term is not limited to the client/server environment that is employed here as a descriptive convenience.

FIG. 2 shows an organization of an exemplary ancillary file 200 for N users. The exemplary ancillary file 200 has three columns, each having N entries. The first column 210 includes the user identifiers, the second column 220 includes versions of the master key encrypted with the key encryption keys, and the third column 230 includes the verification keys. Thus there are N records 250A-250N, a record for each of the N users, each record making an association among a user identifier, the master key encrypted with the identified user's key encryption key, and the user's verification key.

The structure shown in FIG. 2 is exemplary rather than limiting, however, and many equivalent ways to organize and post the information discussed with reference to FIG. 2 will occur to those skilled in the art once taught the present invention. For example, rather than post the encrypted data and the ancillary file separately, the two may be combined, or various subsets of the two may be combined. Other embodiments of the invention include appending a particular user's version of the encrypted master key to the encrypted data, and sending the result to the particular user rather than making a larger body of information more broadly available over the Internet. Here again, other suitable subsets, combinations, permutation, and variations will occur to those skilled in the art, once taught the present invention. For example, subsets of a larger group of users may be authorized to view various releases of encrypted information, where the members of the authorized subset differ from release to release.

Figure 3:
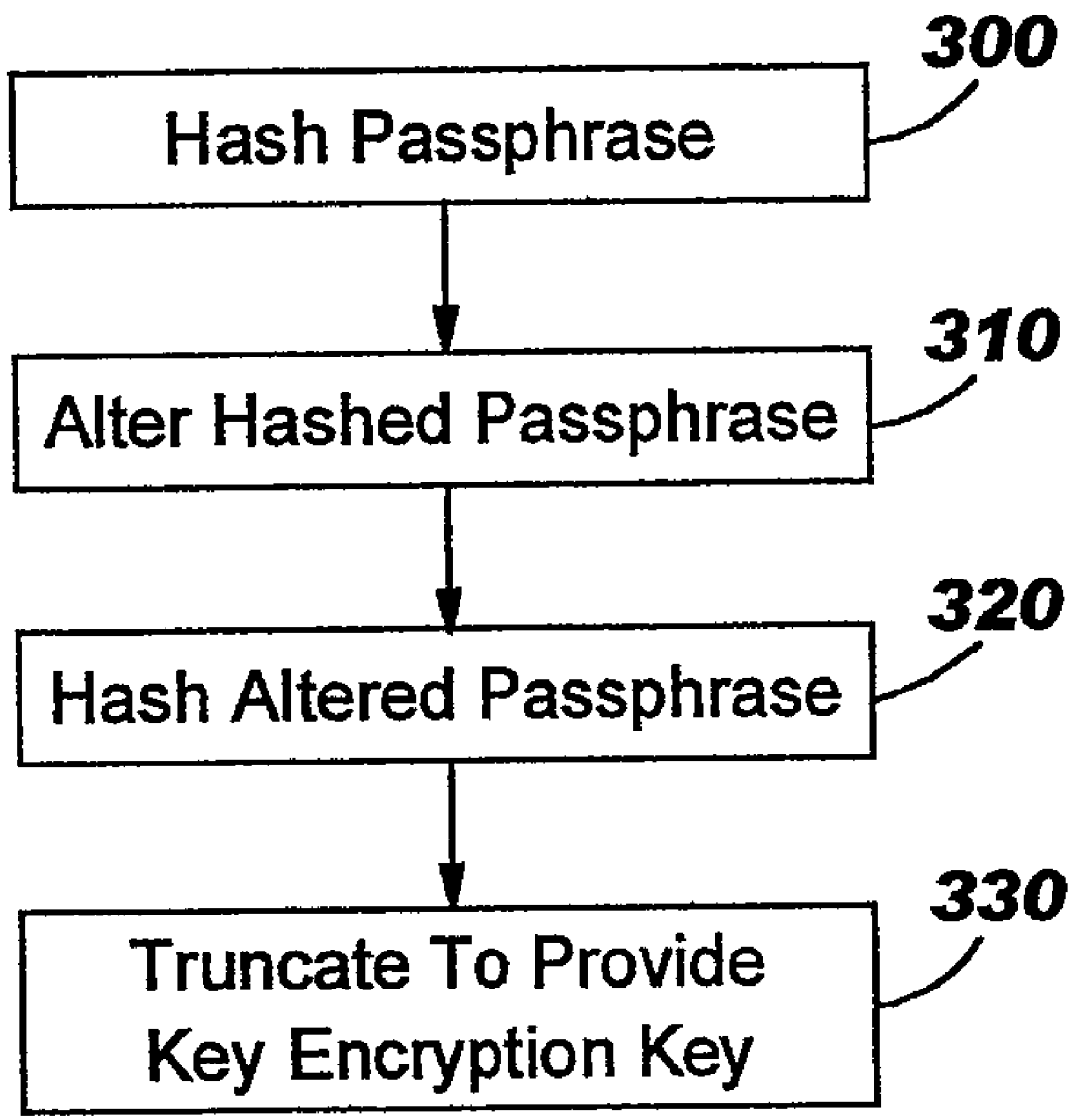
FIG. 3 shows aspects of the inventive method for deriving key encryption keys from passphrases.

FIG. 3 is a flowchart that shows aspects of the inventive method for deriving key encryption keys from passphrases. As shown in FIG. 3, the passphrase is hashed (step 300), to provide a hashed passphrase. Preferred embodiments of the invention use a collision-resistant hash function such as SHA-1 or SHA-2, which are well known, and which are described by Schneier (op cit.). The hashed passphrase is then altered (step 310), in order to further increase resistance to collisions, the result being called here an altered passphrase for descriptive convenience. In a preferred embodiment of the invention, the hashed passphrase is altered by concatenating a predetermined text as a preamble to the hashed passphrase. In one embodiment, the predetermined text is the ASCII representation of the upper-case letters KEK, although the inventors attribute no particular significance to this choice. The altered passphrase is then hashed (step 320), and the result is truncated to provide the user's key encryption key (step 330). In a preferred embodiment, truncation preserves the leading 128 bits.

Figure 4:
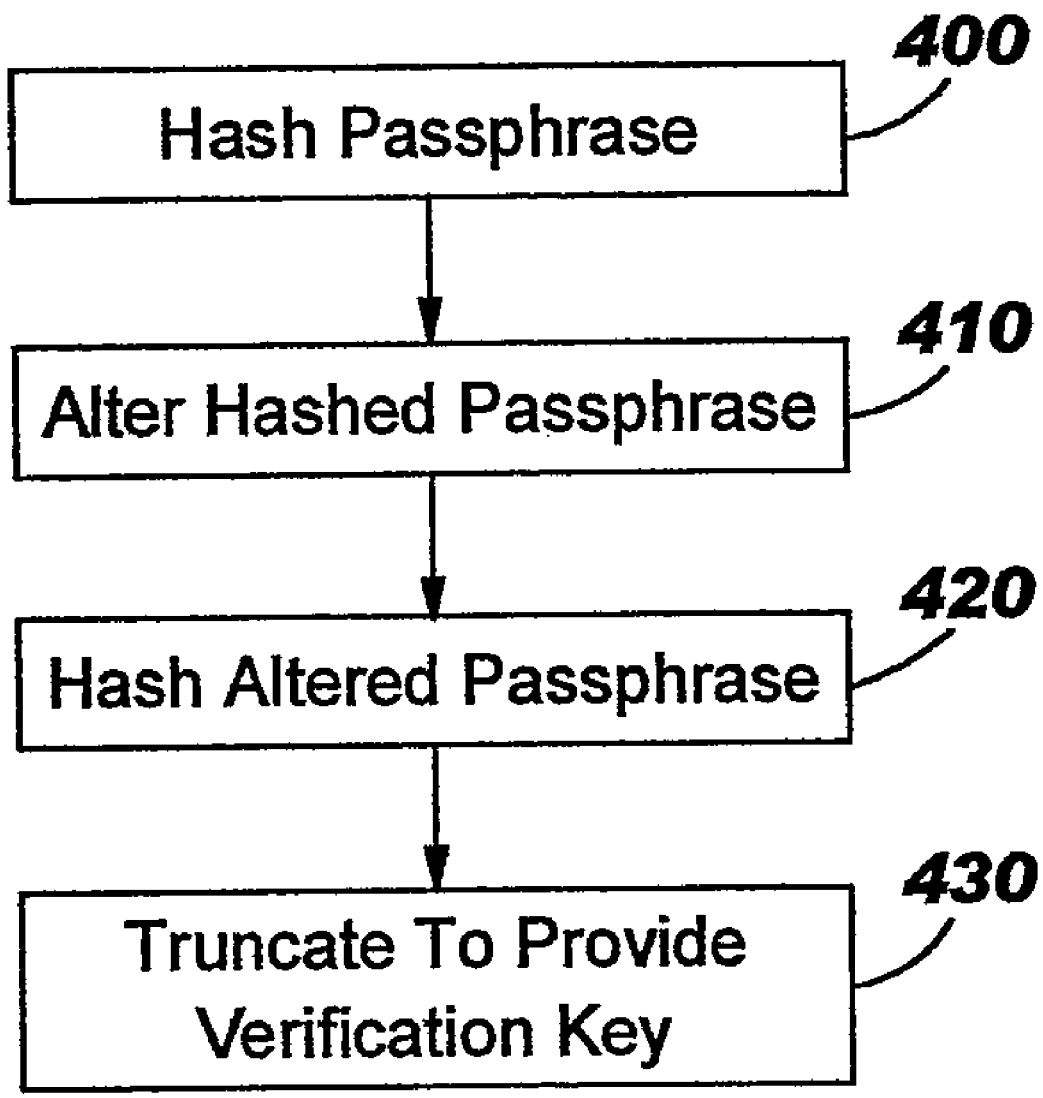
FIG. 4 shows aspects of the inventive method for deriving verification keys from passphrases.

FIG. 4 is a flowchart that shows aspects of the inventive method for deriving verification keys from passphrases. As shown in FIG. 4, the passphrase is hashed (step 400), to provide a hashed passphrase. Preferred embodiments of the invention use a collision-resistant hash function such as SHA-1 or SHA-2, which are well known, and which are described by Schneier (op cit.). The hashed passphrase is then altered (step 410), the result being called here an altered passphrase for descriptive convenience. In a preferred embodiment of the invention, the hashed passphrase is altered by concatenating a predetermined text as a preamble to the hashed passphrase. In one embodiment, the predetermined text is the ASCII representation of the upper-case letters VK, although the inventors attribute no particular significance to this choice. The altered passphrase is then hashed (step 420), and the result is truncated to provide the user's verification key (step 430). In a preferred embodiment, truncation preserves the leading 128 bits.

Figure 5:
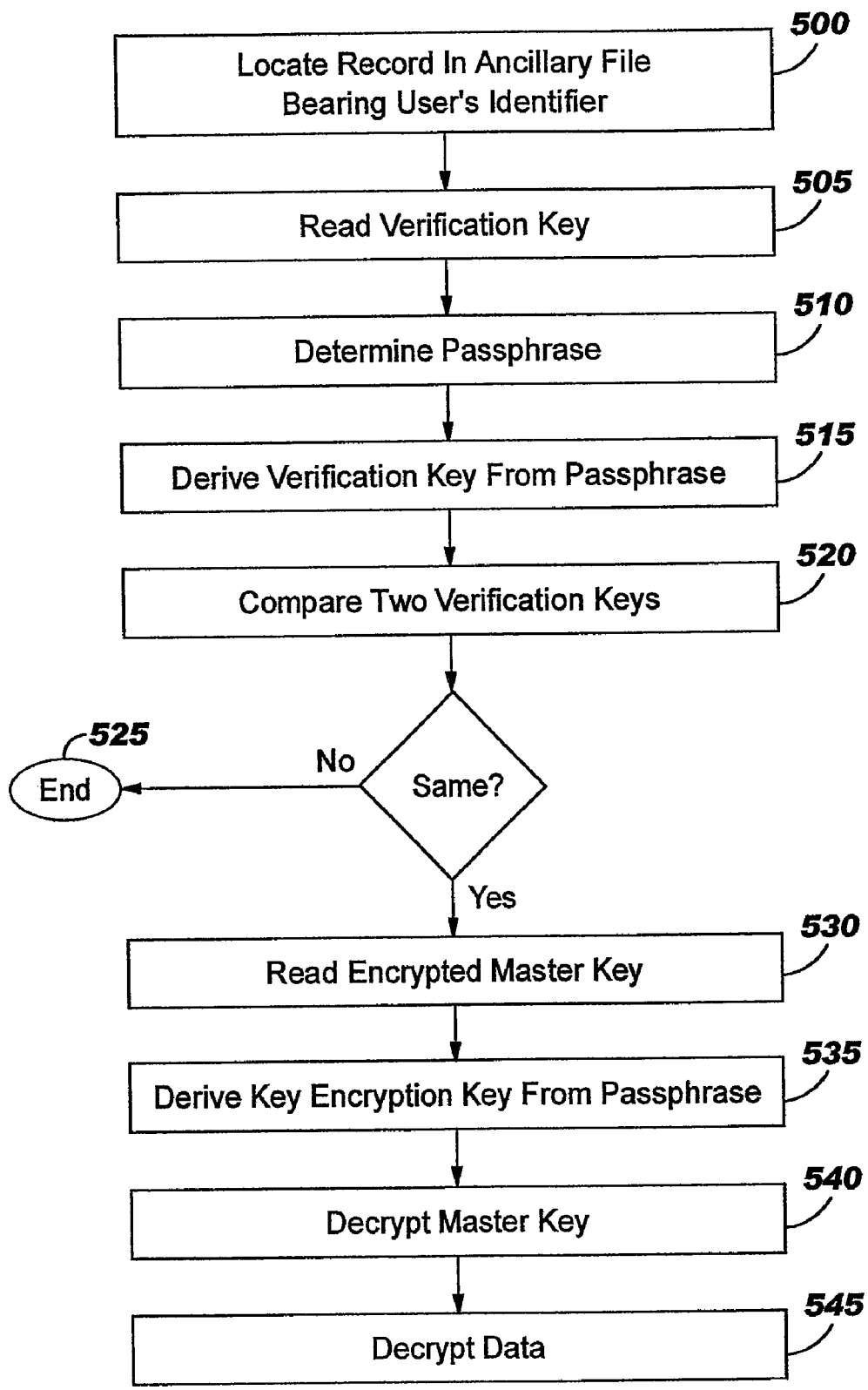
FIG. 5 is a flowchart that shows aspects of an inventive method for reading data protected according to the invention.

The flowchart of FIG. 5 shows aspects of an inventive method for reading data protected according to the invention. The client employed by the user locates the record in the ancillary file 200 that includes the user's identifier (step 500), and reads the associated verification key (step 505). The client then determines the user's passphrase (step 510). In a preferred embodiment, the user enters his or her passphrase into the client whenever the need arises; in other embodiments, the passphrase may be stored in the client. The client derives the verification key locally from the passphrase (step 515), and compares the read verification key with the derived verification key (step 520). If the two verification keys are not the same, the process ends (step 525), as evidently the server and the client have used different passphrases.

Otherwise (i.e., the read verification key and the locally derived verification key are the same), the client reads, from the ancillary file 200, the version of the master key that is encrypted with the user's key encryption key (step 530). The client derives the user's key encryption key locally from the passphrase (step 535), decrypts the master key using the locally derived key encryption key (step 540), and decrypts the data using the master key (step 545).

From the foregoing description, those skilled in the art will now appreciate that the present invention provides a way of protecting large data files that are to be accessed by a large number of users, at the same time minimizes the delay involved and the need for mammoth processing and communication resources, and enables the use of simple key-management processes. The foregoing description is illustrative rather than limiting, however, and the invention is limited only by the claims that follow.

We claim:

1. A method for protecting data for N users using N passphrases respectively known to the N users such that N is at least 2, comprising:
    encrypting data using a master key according to a first symmetric encryption algorithm, to provide encrypted data;
    deriving a key encryption key for each user from the passphrase known to each user;
    encrypting the master key using the key encryption key of each user according to a second symmetric encryption algorithm, to provide an encrypted master key for each user;
    deriving a verification key for each user from the passphrase known to each user, said verification key for each user differing from said key encryption key for each user; and
    posting the encrypted data along with an ancillary file for access by the user, said ancillary file comprising a user identifier specific to each user, the encrypted master key for each user, and the verification key for each user.

2. The method of claim 1, wherein the ancillary file comprises N records and three columns, wherein the N records are respectively associated with the N users, and wherein the three columns comprise a column that includes a user identifier of each user, a column that includes the encrypted master key for each user, and a column that includes the verification key for each user.

3. The method of claim 2, wherein the ancillary file consists of the N records and the three columns.

4. The method of claim 1, wherein the method further comprises: prior to said encrypting data and said encrypting the master key, randomly generating the master key.

5. A program storage device readable by a machine, tangibly embodying a program of instructions executable by the machine to perform the method of claim 1.

6. A method for protecting data for N users using N passphrases respectively known to the N users such that N is at least 2, comprising:
    encrypting data using a master key according to a first symmetric encryption algorithm, to provide encrypted data;
    deriving a key encryption key for each user from the passphrase known to each user;
    encrypting the master key using the key encryption key of each user according to a second symmetric encryption algorithm, to provide an encrypted master key for each user;
    deriving a verification key for each user from the passphrase known to each user, said verification key for each user differing from said key encryption key for each user; and
    posting the encrypted data along with an ancillary file for access by the user, said ancillary file comprising a user identifier specific to each user, the encrypted master key for each user, and the verification key for each user,
    wherein said deriving said key encryption key for each user comprises:
        hashing the passphrase known to each user, to provide a hashed passphrase pertaining to each user;
        altering the hashed passphrase pertaining to each user to provide an altered passphrase pertaining to each user;
        hashing the altered passphrase pertaining to each user, to provide a result pertaining to each user; and
        truncating the result pertaining to each user, to provide the key encryption key for each user.

7. The method of claim 6, wherein said altering comprises concatenating a predetermined text with the hashed passphrase pertaining to each user to provide the altered passphrase pertaining to each user.

8. A method for protecting data for N users using N passphrases respectively known to the N users such that N is at least 2, comprising:
    encrypting data using a master key according to a first symmetric encryption algorithm, to provide encrypted data;
    deriving a key encryption key for each user from the passphrase known to each user;
    encrypting the master key using the key encryption key of each user according to a second symmetric encryption algorithm, to provide an encrypted master key for each user;
    deriving a verification key for each user from the passphrase known to each user, said verification key for each user differing from said key encryption key for each user; and
    posting the encrypted data along with an ancillary file for access by the user, said ancillary file comprising a user identifier specific to each user, the encrypted master key for each user, and the verification key for each user,
    wherein said deriving said verification key for each user comprises:
        hashing the passphrase known to each user, to provide a hashed passphrase pertaining to each user;
        altering the hashed passphrase pertaining to each user to provide an altered passphrase pertaining to each user;
        hashing the altered passphrase pertaining to each user, to provide a result pertaining to each user; and
        truncating the result pertaining to each user, to provide the verification key for each user.

9. The method of claim 8, wherein said altering comprises concatenating a predetermined text with the hashed passphrase pertaining to each user to provide the altered passphrase pertaining to each user.

* * * * *